United States Patent
Jakubowicz et al.

(10) Patent No.: US 10,737,589 B2
(45) Date of Patent: Aug. 11, 2020

(54) PASSENGER SUPPORT

(71) Applicant: Faurecia Automotive Seating, LLC, Auburn Hills, MI (US)

(72) Inventors: Zenon Jakubowicz, Clawson, MI (US); Eryk Dabrowski, Bloomfield Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 472 days.

(21) Appl. No.: 15/480,892

(22) Filed: Apr. 6, 2017

(65) Prior Publication Data

US 2017/0291509 A1    Oct. 12, 2017

Related U.S. Application Data (60) Provisional application No. 62/318,808, filed on Apr. 6, 2016.

(51) Int. Cl.
*B60N 2/07* (2006.01)
*B60N 2/08* (2006.01)

(52) U.S. Cl.
CPC ......... *B60N 2/0705* (2013.01); *B60N 2/0715* (2013.01); *B60N 2/0818* (2013.01); *B60N 2/0875* (2013.01)

(58) Field of Classification Search
CPC ........ B60N 2/07; B60N 2/071; B60N 2/0818; B60N 2/0875; B60N 2/0705; B60N 2/0715
USPC .......... 305/143; 248/429; 297/216.1, 216.15, 297/216.16, 216.17, 216.18; 312/334.27, 312/334.29, 334.31, 334.32, 334.33, 312/334.34, 334.38
See application file for complete search history.

(56) References Cited

U.S. PATENT DOCUMENTS

| | | | | |
|---|---|---|---|---|
| 3,926,397 A | * | 12/1975 | Hunwicks | B60N 2/0705 248/430 |
| 5,855,350 A | * | 1/1999 | Volker | B60N 2/0705 248/430 |
| 6,557,809 B2 | * | 5/2003 | Downey | B60N 2/0705 248/430 |
| 7,025,319 B2 | * | 4/2006 | Willems | B60N 2/0715 248/430 |
| 8,297,583 B2 | * | 10/2012 | Kimura | B60N 2/0705 248/429 |
| 8,936,227 B2 | * | 1/2015 | Kawamura | B60N 2/08 248/429 |
| 9,016,655 B2 | | 4/2015 | Aoi | |
| 9,963,048 B2 | * | 5/2018 | Nomura | B60N 2/0705 |
| 2005/0145768 A1 | * | 7/2005 | Rohee | B60N 2/0705 248/430 |

(Continued)

FOREIGN PATENT DOCUMENTS

| | | | | |
|---|---|---|---|---|
| DE | 2437499 A1 | * | 3/1975 | .......... B60N 2/0705 |
| DE | 2549711 A1 | * | 5/1977 | |

(Continued)

*Primary Examiner* — Kimberly T Wood
(74) *Attorney, Agent, or Firm* — Barnes & Thornburg LLP (57) ABSTRACT

A passenger support includes a vehicle seat and a foundation having a lower track and an upper track. The lower track is coupled to a floor of a vehicle in a fixed position relative the floor. The vehicle seat is coupled to the upper track to slide back and forth relative to the lower track.

22 Claims, 12 Drawing Sheets

(56) References Cited

U.S. PATENT DOCUMENTS

| | | | | |
|---|---|---|---|---|
| 2005/0285005 A1* | 12/2005 | Severini | ............... | B60N 2/0702 |
| | | | | 248/346.06 |
| 2009/0322136 A1* | 12/2009 | Kazyak | ................ | B60N 2/0705 |
| | | | | 297/344.1 |
| 2012/0294674 A1* | 11/2012 | Lee | ...................... | B60N 2/0705 |
| | | | | 403/322.4 |
| 2013/0020459 A1* | 1/2013 | Moriyama | ............... | B60N 2/01 |
| | | | | 248/636 |
| 2013/0075571 A1* | 3/2013 | Suck | ...................... | B60N 2/072 |
| | | | | 248/430 |
| 2013/0181494 A1* | 7/2013 | Haller | .................. | B60N 2/0705 |
| | | | | 297/344.1 |
| 2014/0353454 A1* | 12/2014 | Yamada | ............... | B60N 2/0705 |
| | | | | 248/430 |
| 2019/0001842 A1* | 1/2019 | Quast | .................. | B60N 2/0705 |

FOREIGN PATENT DOCUMENTS

| | | | | | |
|---|---|---|---|---|---|
| DE | | 19513707 A1 | * | 10/1996 | ........... B60N 2/0705 |
| DE | | 19548871 C1 | * | 3/1997 | ........... B60N 2/0705 |
| DE | | 19858846 A1 | * | 6/2000 | ........... B60N 2/0705 |
| FR | | 3028223 B1 | * | 1/2017 | ........... B60N 2/0727 |
| JP | | 2014091490 A | | 5/2014 | |

\* cited by examiner

PASSENGER SUPPORT

PRIORITY CLAIM

This application claims priority under 35 U.S.C. § 119(e) to U.S. Provisional Application Ser. No. 62/318,808, filed Apr. 6, 2016, which is expressly incorporated by reference herein.

BACKGROUND

The present disclosure relates to vehicle seats, and particularly to movable vehicle seats. More particularly, the present disclosure relates to a foundation adapted to couple a vehicle seat to a floor of a vehicle.

SUMMARY

According to the present disclosure, a passenger support includes a vehicle seat and a seat foundation. The seat foundation is arranged to interconnect the vehicle seat to a floor of a vehicle to allow the vehicle seat to move between a slid-forward configuration, a slid-back configuration, and a medial configuration. The seat foundation includes a lower track coupled to the floor in a fixed position relative to the floor and an upper track coupled to the vehicle seat to move therewith relative to the lower track.

In illustrative embodiments, the passenger support further includes a track-support system. The track-support system is coupled to the seat foundation and configured to minimize unintended deflection in the seat foundation as a passenger moves the vehicle between the configurations. The track-support system includes an upper support unit coupled to the upper track to move therewith and relative thereto and a lower support unit coupled to the upper track to move with the upper track and relative to the upper track and the upper support unit.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figures 1, 2:
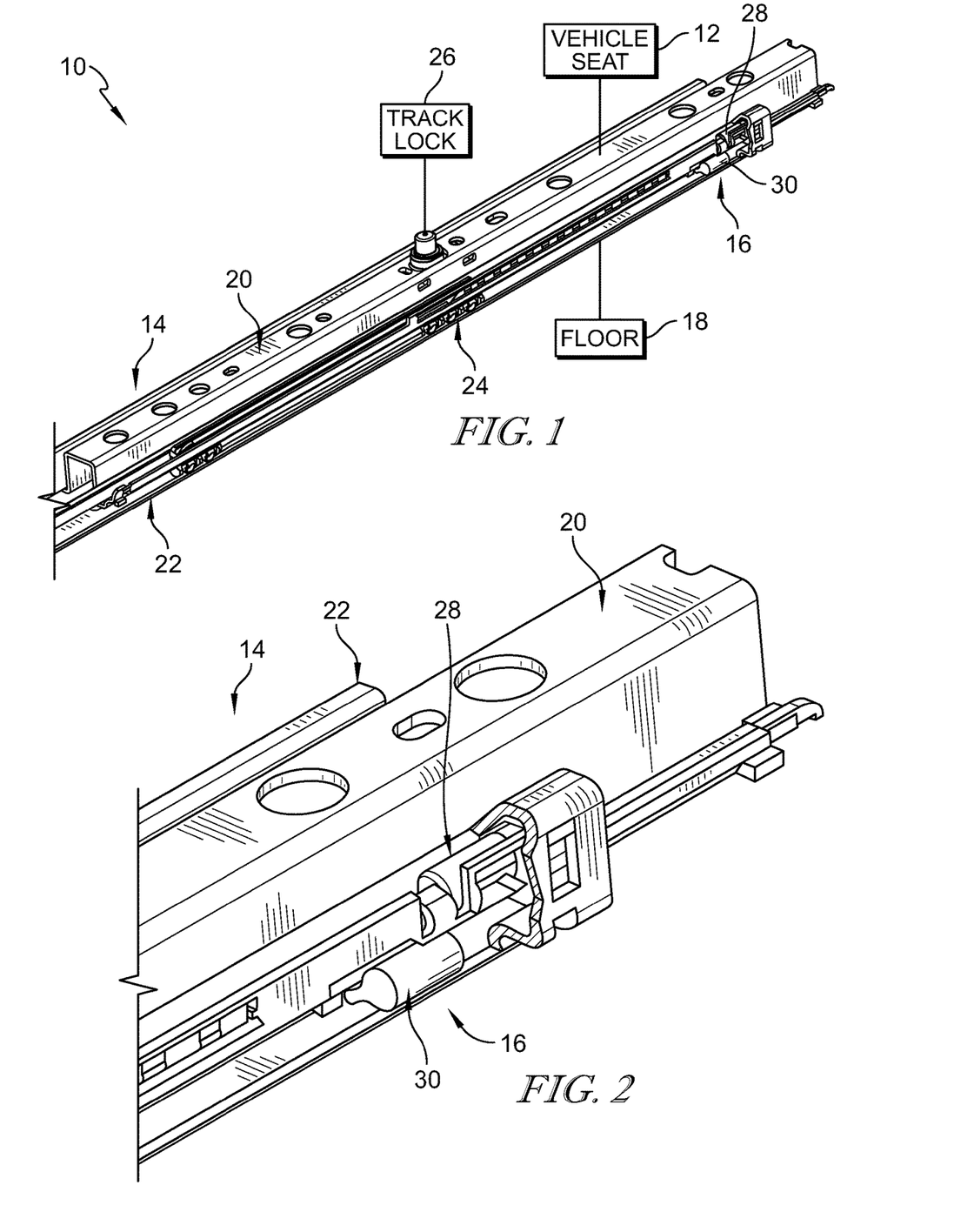
FIG. 1 is a diagrammatic view of a passenger support in accordance with the present disclosure showing that the passenger support includes a vehicle seat and a foundation configured to interconnect the vehicle seat to a floor of a vehicle to slide back and forth relative to the floor.
FIG. 2 is an enlarged partial perspective view of the foundation of FIG. 1 showing that the foundation includes an upper track coupled to the vehicle seat and a lower track coupled to the floor of the vehicle and suggesting that the passenger support further includes a track-support system coupled to the foundation to support the tracks when the vehicle seat is a slid-forward configuration, a slid-back configuration, and a medial configuration.

A passenger support 10 in accordance with the present disclosure is shown diagrammatically in FIG. 1. The passenger support 10 includes a vehicle seat 12, a seat foundation 14, and a track-support system 16 as suggested in FIG. 1. The foundation 14 interconnects the vehicle seat 12 to a floor 18 of a vehicle to allow the vehicle seat 12 to move back and forth relative to the floor 18 between a slid-forward configuration, a slid-back configuration, and a medial configuration therebetween. The track-support system 16 is coupled to the foundation 14 and configured to provide support to the foundation 14 as the vehicle seat 12 moves between the various configurations while maximizing stability of the foundation 14 in the various configurations so that passenger comfort and user experience is maximized.

Figure 3:
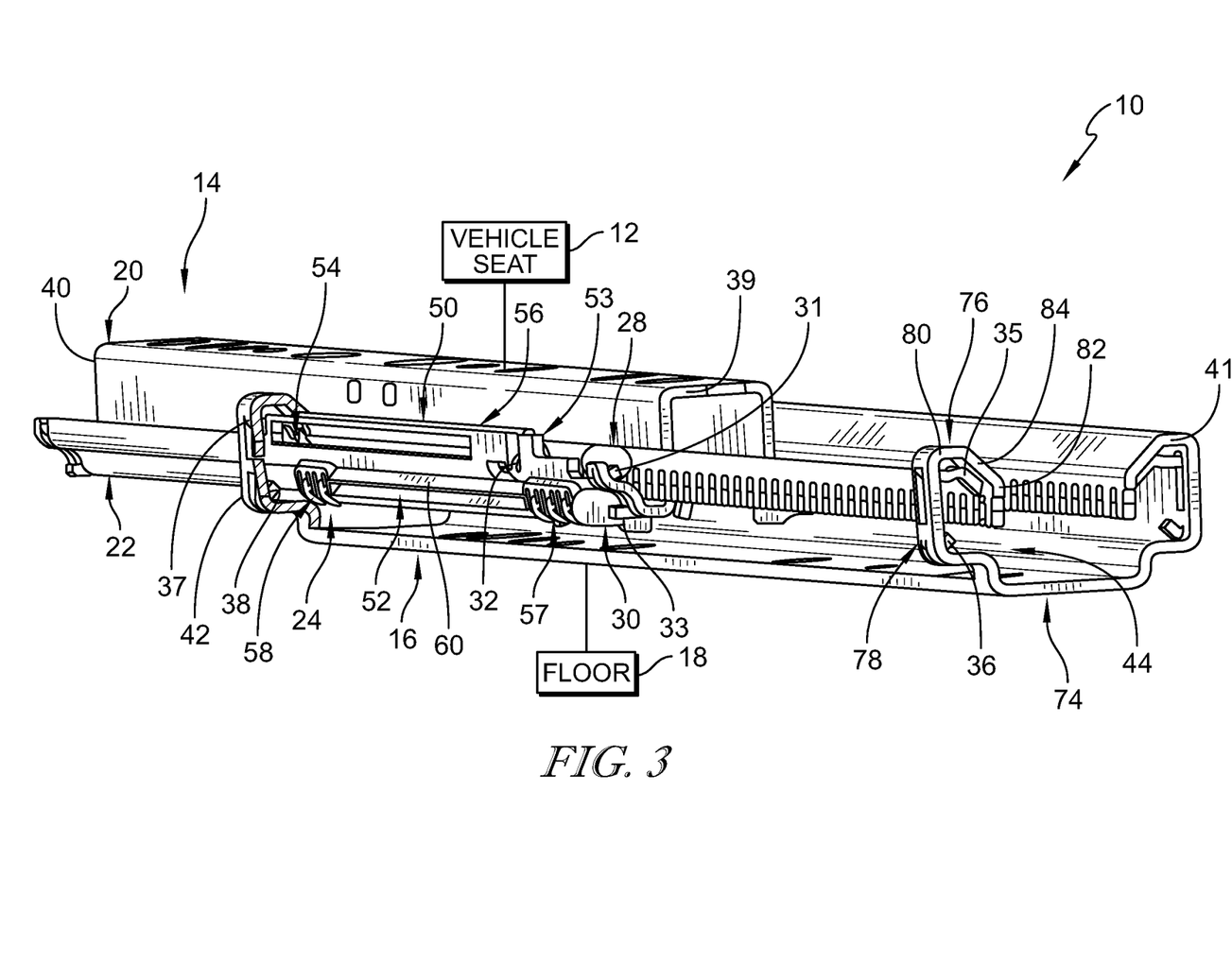
FIG. 3 is a partial perspective view of the foundation in the slid-forward configuration with portions broken away to reveal that track-support system includes an upper support unit, a lower support unit, upper and lower retainers coupled to the lower track to retain the support units on the lower track, and upper and lower barriers coupled to the upper track to limit movement of the support units as the vehicle seat moves between the various configurations.
Figure 4:
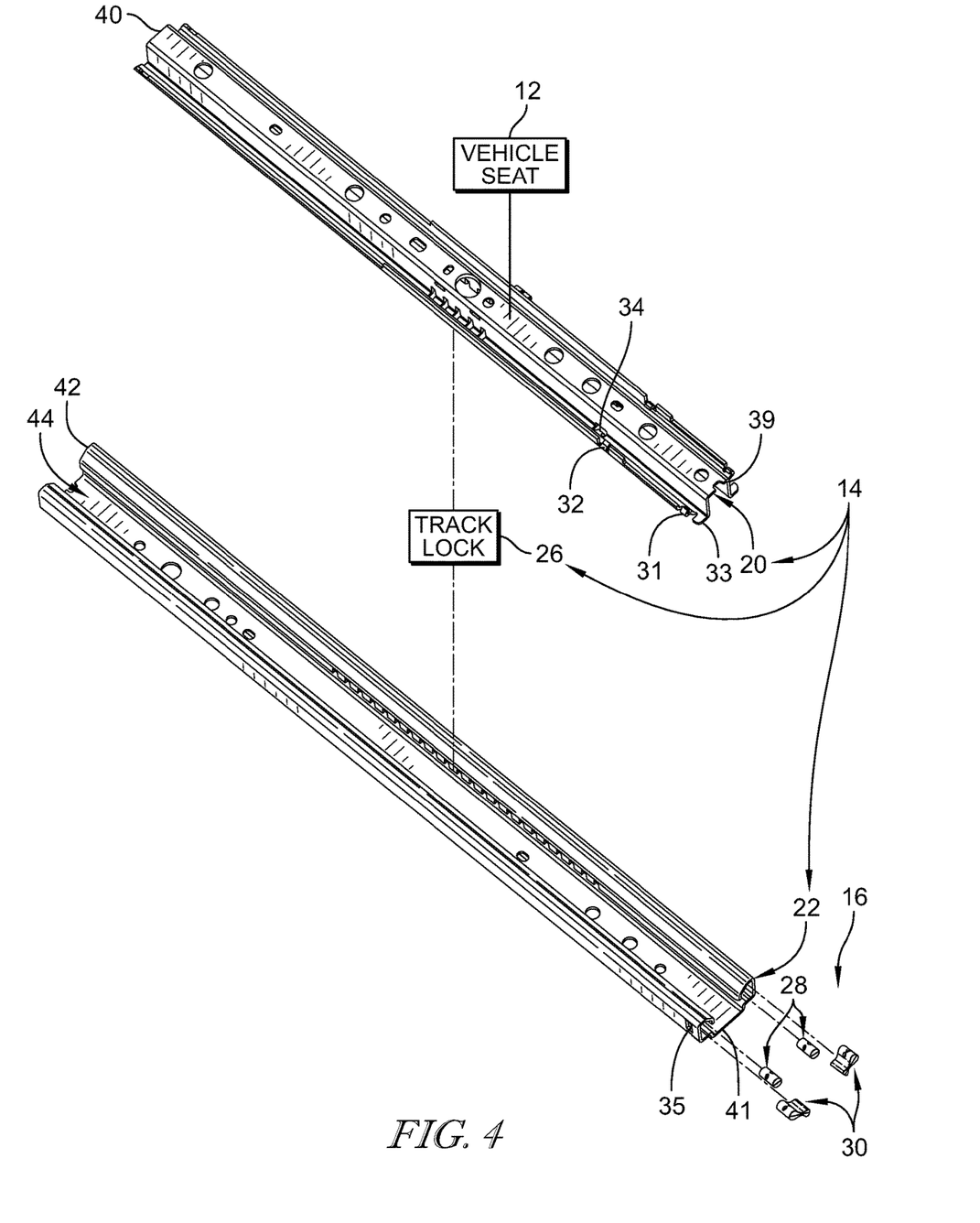
FIG. 4 is an exploded assembly view showing that the passenger support includes, from top to bottom, the vehicle seat, the upper track, a track lock configured to block selectively movement of the upper track relative to the lower track, the lower track, a pair of upper support units, and a pair of lower support units.

The foundation 14 includes a pair of rails and each rail includes an upper track 20, a lower track 22, a bearing system 24, and a track lock 26 as shown in FIG. 1 and suggested in FIGS. 3 and 4. The lower track 22 is coupled to the floor 18 in a fixed position relative to the floor. The vehicle seat 12 is coupled to the upper track 20 to slide therewith back and forth along a travel path A1 between the slid-forward configuration, the slid-back configuration, and the medial configuration therebetween. The bearing system 24 is located between the tracks 20 and 22 and configured to minimize friction between the tracks 20 and 22 during sliding movement of the upper track 20 relative to the lower track 22. The track lock 26 is coupled to the upper track 20 and configured to move selectively between an engaged position in which the track lock 26 blocks movement of the upper track 20 relative to the lower track 22 and a disengaged position in which the upper track 20 is free to move relative to the lower track 22.

The track-support system 16 includes an upper support unit 28 and a lower support unit 30 associated with each rail as shown in FIGS. 3 and 4. The upper support unit 28 is located in spaced-apart relation to the lower support unit 30 to locate a portion of the upper track 20 between them. As the vehicle seat 12 and the upper track 20 move between the slid-forward configuration, the slid-back configuration, and the medial configuration, the upper and lower supports 28, 30 are configured to maintain spacing between the upper and lower tracks 20, 22 and minimize binding and deformation of the tracks 20, 22. As a result, smooth operation of the foundation may be experienced over the full range of motion between the slid-back and slid-forward configurations.

The track-support system 16 further includes a set of barriers coupled to the upper track 20 to limit movement of the upper and lower support units 28, 30 relative to upper track 20 as shown in FIG. 3. The set of barriers includes first and second upper barriers 31, 32 and first and second lower barriers 33, 34 as shown in FIG. 3. The first and second upper barriers 31, 32 cooperate to limit movement of the upper support unit 28 relative to the upper track 20. The first and second lower barriers 33, 34 cooperate to limit movement of the lower support unit relative to the lower track 22. The upper and lower barriers 31, 32, 33, 34 are coupled to the upper track in a fixed position relative to the upper track 20. As suggested in FIG. 3, the upper track 20 includes two sets of barriers with each set located on one longitudinal side of the upper track opposite the other set.

The track-support system 16 further includes a set of retainers coupled the lower track 22 to retain the upper and lower support units 28, 30 in engagement with the upper and lower tracks 20, 22. The set of retainers includes first upper and lower retainers 35, 36 and second upper and lower retainers 37, 38 as suggested in FIG. 3. The lower track 22 includes two sets of retainers with each set located on one longitudinal side of the lower track 22 opposite the other set. The first and second upper retainers 35, 37 are coupled to the lower track 22 in a fixed position relative to the lower track 22 and configured to keep the upper support unit 28 in engagement with both the upper and lower tracks 20, 22. The first and second lower retainers 36, 38 are coupled to the lower track 22 in a fixed position relative to the lower track 22 and configured to keep the lower support unit 30 in engagement with both the upper and lower tracks 20, 22.

The upper track 20 includes a first upper end 39 and an opposite second upper end 40 as shown in FIG. 4. The lower track 22 includes a first lower end 41 and a second lower end 42 as shown in FIG. 4. In use, for example, the first lower end 41 of the lower track 22 is at a rear portion of the passenger support 10 and the second lower end 42 is at a forward portion of the passenger support 10.

When the vehicle seat 12 is in the slid-forward configuration, the first upper end 39 of the upper track 20 is located a first distance D1 from the first lower end 41 of the lower track 22. As a result, the second upper end 40 of the upper track 20 is located at a forward most position so as to locate the second lower end 42 of the lower track 22 between the first and second upper ends 39, 40 of the upper track 20.

When the vehicle seat 12 is in the slid-back configuration, the first upper end 39 of the upper track 20 is located a relatively smaller second distance D2 from the first lower end 41 of the lower track 22. As a result, the first upper end 39 of the upper track 20 is located at a rear most position so as to locate the first lower end 41 of the lower track 22 between the first and second upper ends 39, 40 of the upper track 20.

When the vehicle seat 12 is in the medial configuration, the first upper end 39 of the upper track 20 is located a third relatively smaller distance from the first lower end 41 of the lower track 22. In one example, the third distance is smaller than the first and second distances D1, D2. As a result, the second upper end 40 of the upper track 20 is located at a forward most position so as to locate the second lower end 42 of the lower track 22 between the first and second upper ends 39, 40 of the upper track 20.

As shown in FIG. 3, the set of barriers coupled to the upper track 20 are arranged to limit movement of the upper and lower support units 28, 30 relative to the upper track 20. The first lower barrier 33 is appended to the first upper end 39 of the upper track 20 and arranged to extend in a forward direction toward the opposite second upper end 40. The second lower barrier 34 is located in spaced-apart longitudinal relation to the first lower barrier 33. The first upper barrier 31 is located in spaced-apart longitudinal relation to the first lower barrier 33 and arranged to lie between the first lower barrier 33 and the second lower barrier 34. The second upper barrier 32 is located in spaced-apart longitudinal relation to the first upper barrier 31 and located between the first upper barrier 31 and the second lower barrier 34. As a result, the upper support unit 28 is allowed to travel a distance between the first and second upper barriers 31, 32 and the lower support unit 30 is allowed to travel a relatively larger distance between the first and second lower barriers 33, 34.

As shown in FIG. 3, the set of retainers 35, 36, 37, 38 retain the upper and lower support units 28, 30 in engagement with the upper and lower tracks 20, 22. The first upper retainer 35 is coupled to the lower track 22 and arranged to extend into a lower-track channel 44 formed in the lower track 22. The first upper retainer 35 is located in spaced-apart longitudinal relation to the first lower end 41 of the lower track 22 by a first distance. The first lower retainer 36 is coupled to the lower track 22 and arranged to extend into the lower-track channel 44. The first lower retainer 36 is located in spaced-apart longitudinal relation to the first lower end 41 a relatively greater second distance. As suggested in FIG. 3, the first upper retainer 35 has a thickness greater than the first lower retainer 36. The first upper and lower retainers 35, 36 are aligned vertically with one another so as to overlap. The second upper and lower retainers 37, 38 are similar to the first upper and lower retainers 35, 36 but being located relative to the second lower end 42 of the lower track 22.

Figure 5:
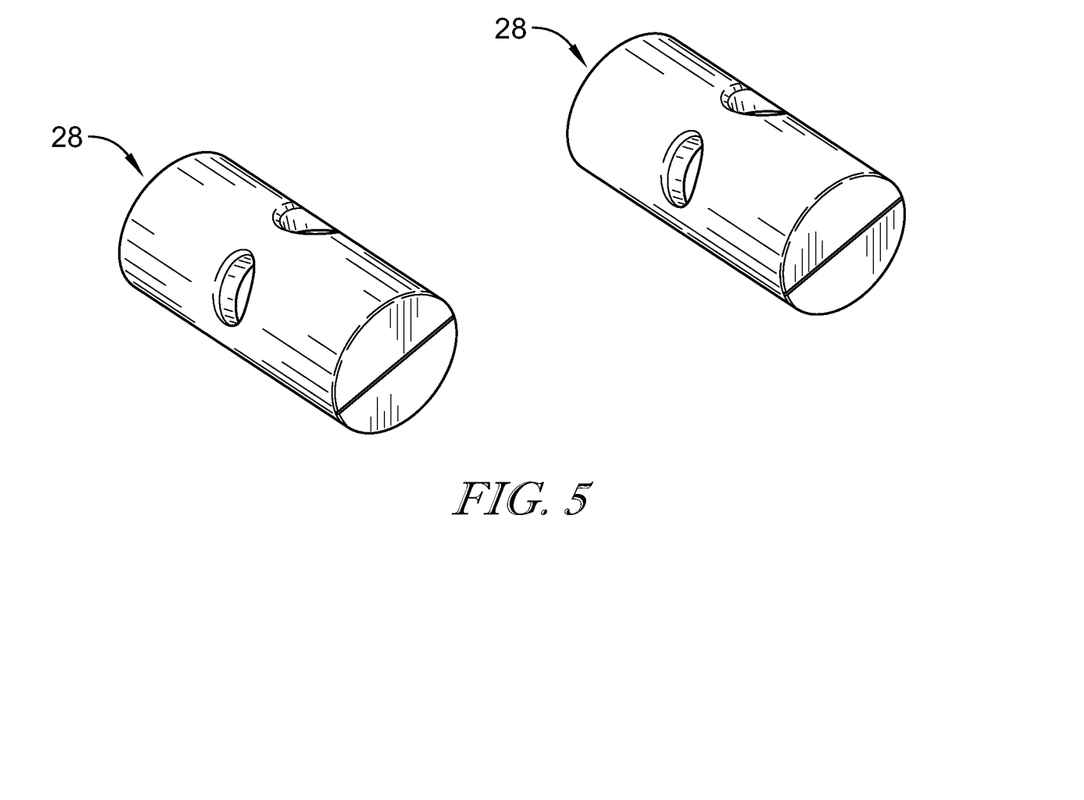
FIG. 5 is an enlarged perspective view of the upper support units showing that the upper support units have a generally cylindrical shape.

The upper support unit 28 has a generally cylindrical shape as shown in FIG. 5. The upper support unit may have any other suitable shape. The upper support unit 28 is made from plastics materials, but may be made from any other suitable alternative. The upper support unit 28 is configured to engage and contact the first and second upper barriers 31, 32 during movement of the vehicle seat between the slid-forward, slid-back, and medial configurations.

Figure 6:
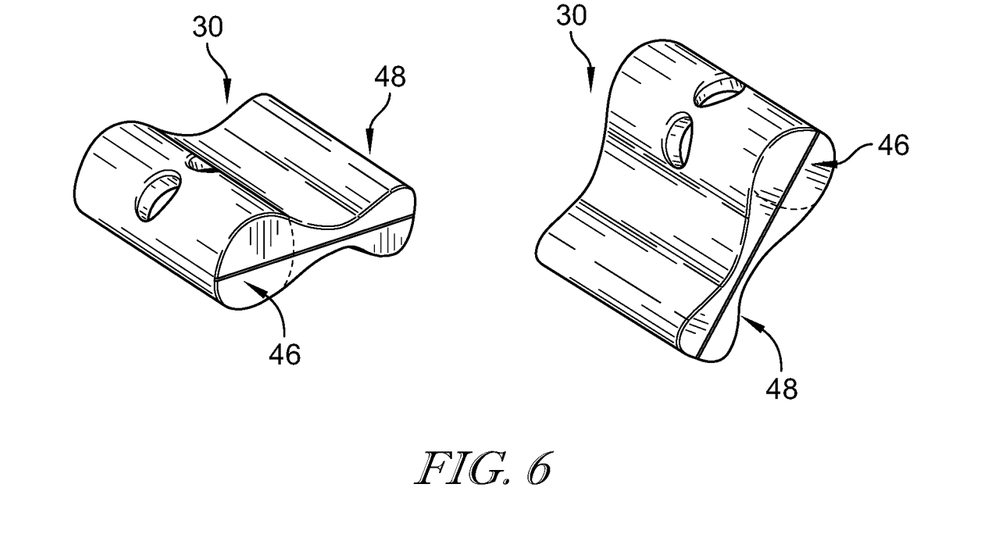
FIG. 6 is an enlarged perspective view of the lower support units showing that the lower support units includes a cylindrically-shaped support-unit body and a bow-tie shaped support-unit tail coupled to the support-unit body.

The lower support 30 includes a support-unit body 46 and a support-unit tail 48 as shown in FIG. 6. The lower support unit 30 is made from plastics materials, but may be made from any other suitable alternative. The support-unit body 46 has a generally cylindrical shape and the support-unit tail 48 has a generally bow-tie shape. As shown in FIG. 6, the support-unit tail 48 is coupled to the support-unit body 46 at one end of the wide portion of the bow-tie shape and is arranged to extend downwardly toward the travel path A1. The support-unit body 46 is configured to engage and contact the first lower barrier 33. The support-unit tail 48 is configured to engage and contact the second lower barrier 34.

Figure 9:
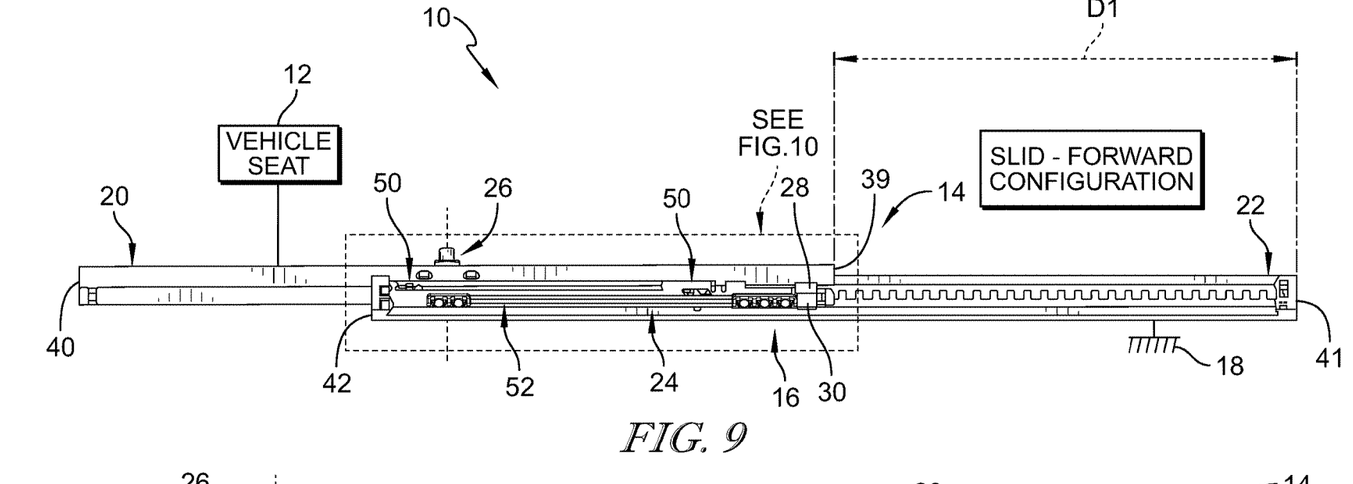
FIG. 9 is an elevational view of the foundation and track-support system in the slid-forward configuration.
Figure 10:
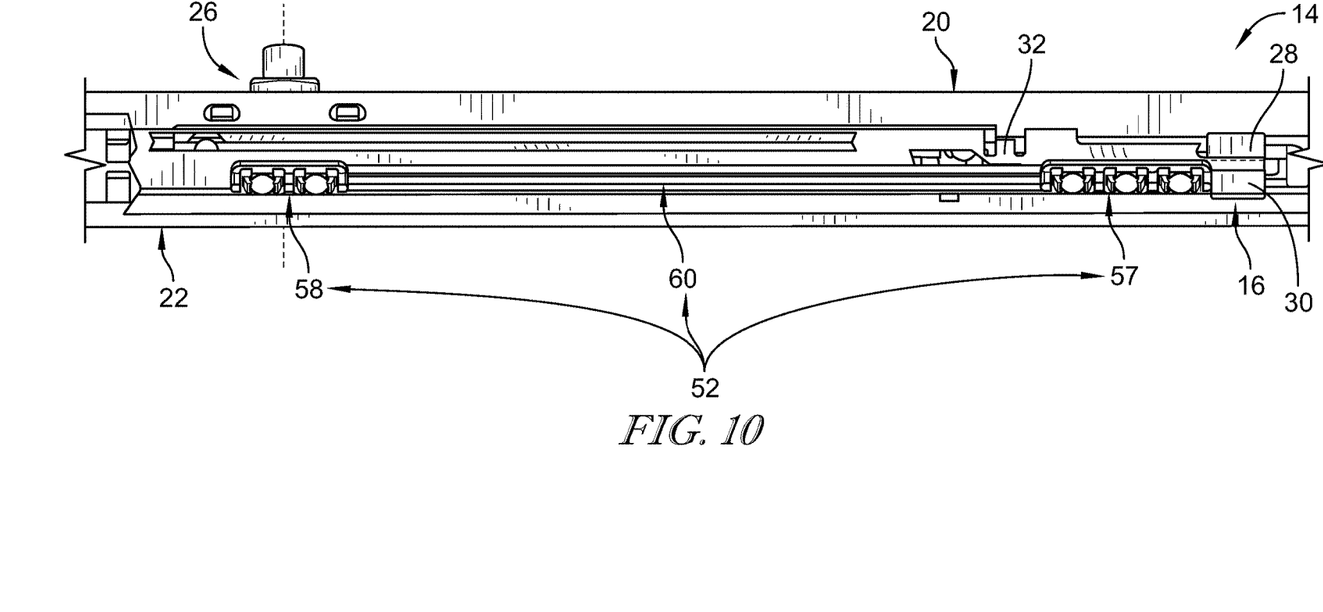
FIG. 10 is an enlarged portion taken from the circled region of FIG. 9 showing that foundation further includes a bearing system configured to minimize friction between the upper and lower tracks and showing that a portion of the bearing system is aligned with the track lock and that the upper and lower support units are aligned a rear end of the foundation.
Figure 11:
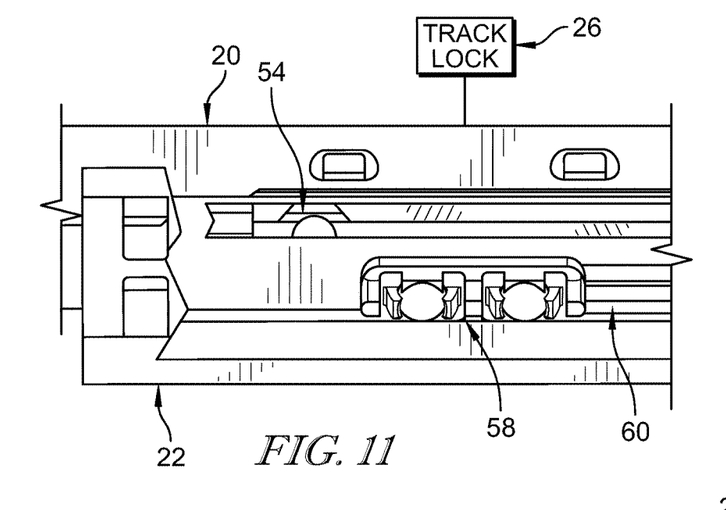
FIG. 11 is an enlarged portion of FIG. 10 showing a forward portion of the bearing system aligned under the track lock.

The bearing system 24 is located between the upper track 20 and the lower track 22 and configured to minimize friction between upper track 20 and the lower track 22 as the upper track 20 slides back and forth as suggested in FIGS. 9 and 10. The bearing system 24 includes an upper bearing unit 50 and a lower bearing unit 52. The upper bearing unit 50 is spaced apart from the lower bearing unit 52 to locate a portion of the upper track 20 between the upper bearing unit 50 and the lower bearing unit 52. The upper bearing unit 50 moves back and forth relative to the lower track 22 along an upper-bearing travel path. The lower bearing unit 52 moves back and forth relative to the lower track 22 along a lower-bearing travel path. In one example, the upper-bearing travel path is generally parallel to the lower-bearing travel path. In another example, the upper-bearing travel path and lower-bearing travel paths are spaced apart from and generally parallel to the travel path A1.

The upper bearing unit 50 includes a first bearing cage 53, a second bearing cage 54 located in spaced-apart longitudinal relation to the first bearing cage 53, and a cage link 56 as suggested in FIGS. 9-12. The first bearing cage 53 is located between the first and second upper ends 39, 40 of the upper track 20. The second bearing cage 54 is located between the first bearing cage 53 and the second upper end 40 of the upper track. The cage link 56 is located between the first and second bearing cages 53, 54 and is arranged to extend between and interconnect to bearing cages 53, 54. As a result, the first and second bearing cages 53, 54 are constrained to move together along the upper-bearing travel path. Each bearing cage 53, 54 may include one or more ball bearings and an associated mount for each ball bearing.

The lower bearing unit 52 includes a first bearing cage 57, a second bearing cage 58 located in spaced-apart longitudinal relation to the first bearing cage 57, and a cage link 60 as shown in FIG. 10. The first bearing cage 57 is located between the first and second upper ends 39, 40 of the upper track 20. The second bearing cage 58 is located between the first bearing cage 57 and the second upper end 40 of the upper track. The cage link 60 is located between the first and second bearing cages 57, 58 and is arranged to extend between and interconnect to bearing cages 57, 58. As a result, the first and second bearing cages 57, 58 are constrained to move together along the lower-bearing travel path. Each bearing cage 57, 58 may include one or more ball bearings and an associated mount for each ball bearing.

Figure 12:
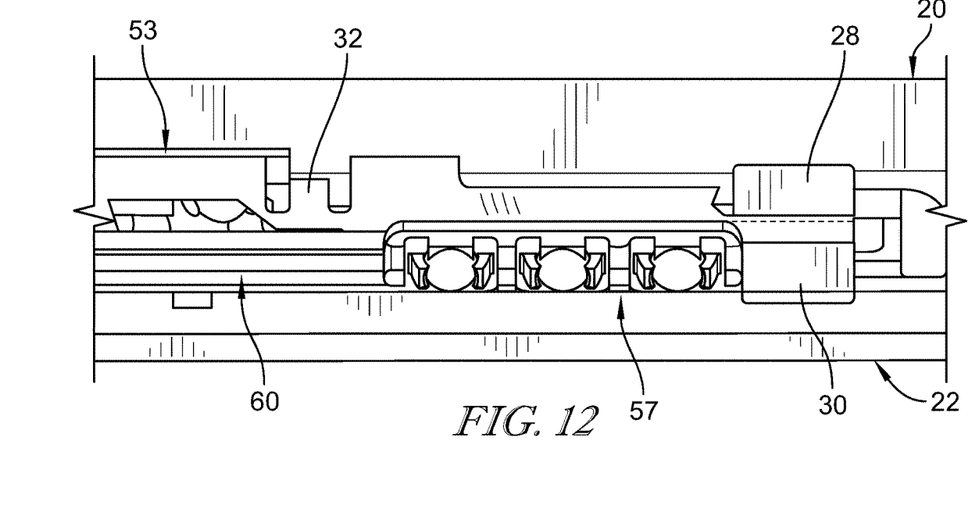
FIG. 12 is an enlarged portion of FIG. 10 showing the upper and lower support units aligned vertically and showing a rear portion of the bearing system engaged with the lower support unit.
Figure 13:
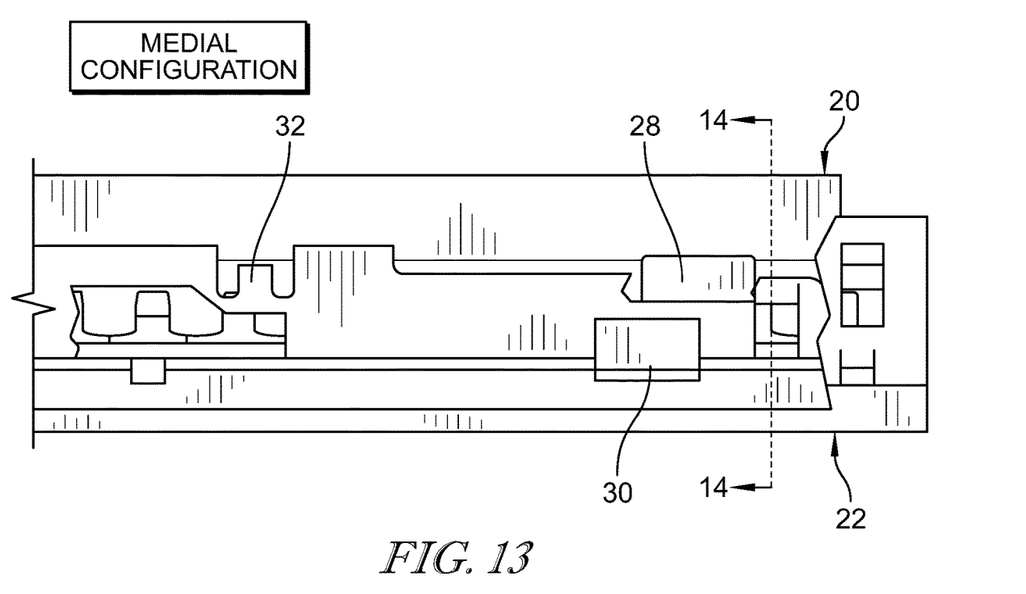
FIG. 13 is a partial elevation view of the foundation in transition from the slid-back configuration toward the medial configuration showing how the upper barriers of the upper track limit movement of the upper support unit and the lower barriers of the upper track limit movement of the lower support unit.

In an example of use, the vehicle seat 12 begins in the slid-forward configuration as shown in FIGS. 9-12. In the slid-forward configuration, the upper and lower support units 28, 30 are aligned vertically with one another as shown in FIG. 12. At the same time, the second bearing cage 58 of the lower bearing unit 52 is aligned vertically with the track lock 26 as shown in FIG. 10. The first bearing cage 57 of the lower bearing unit 52 is engaged with the lower support unit 30.

Figure 15:
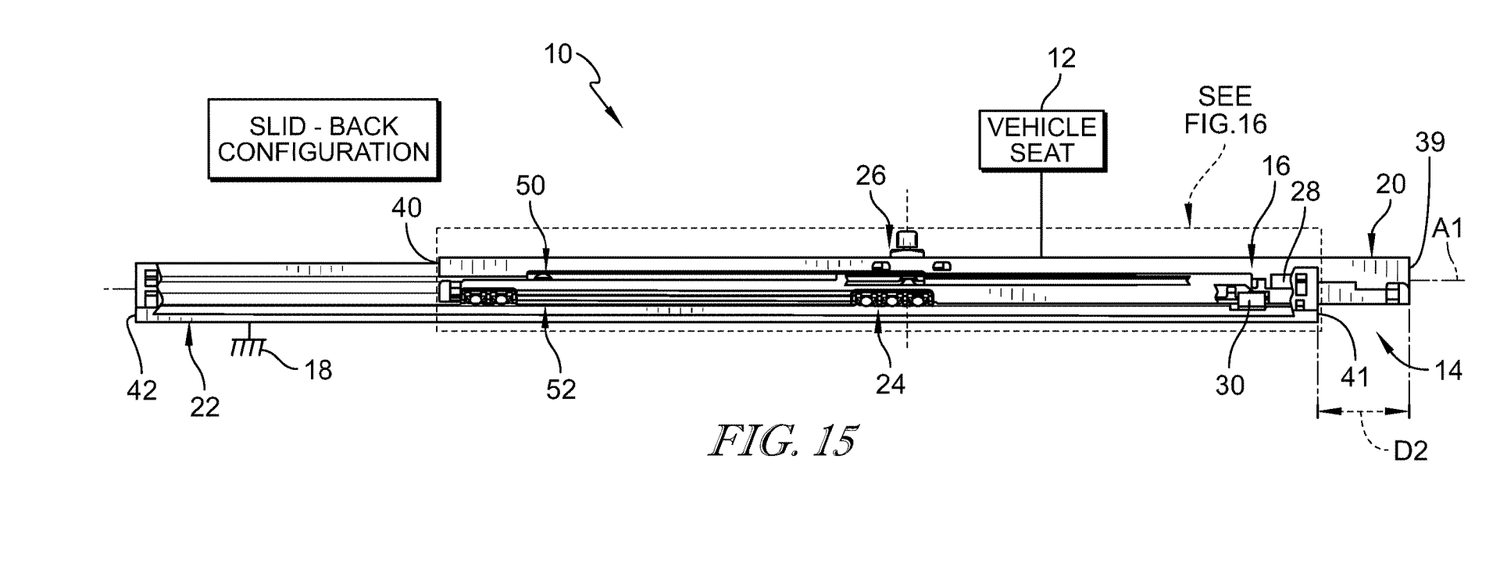
FIG. 15 is a partial elevation view of the foundation in the slid-back configuration showing the relative locations of the bearing system and the upper and lower support units.
Figure 16:
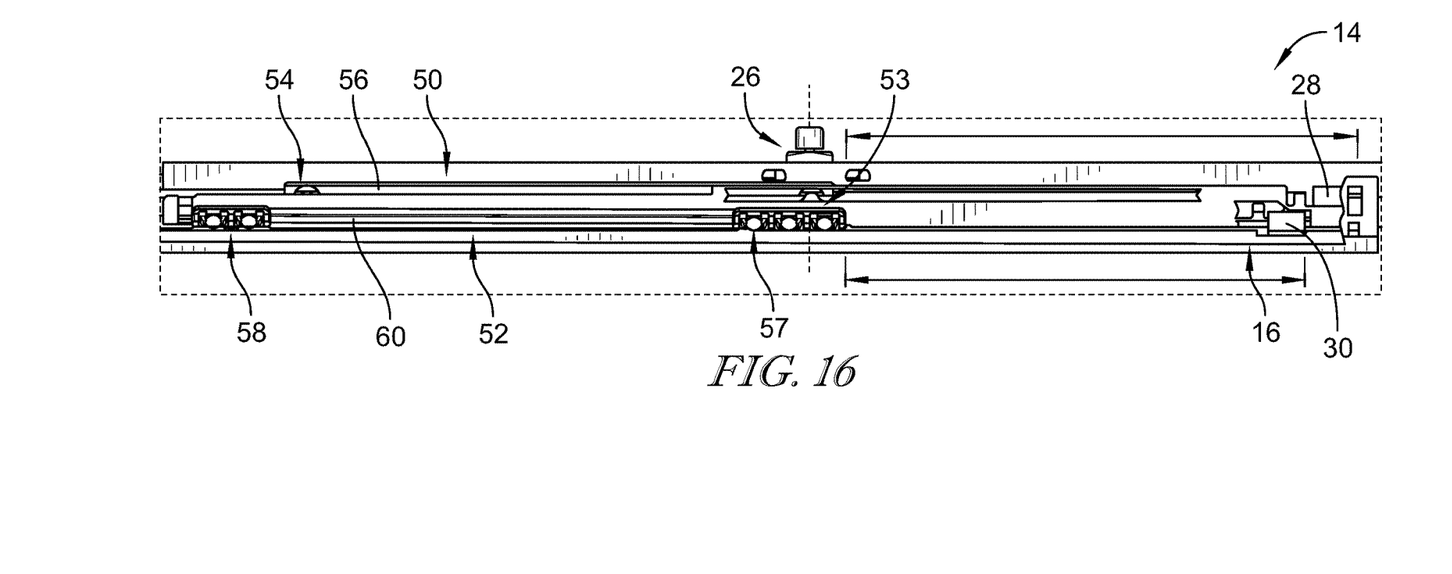
FIG. 16 is an enlarged portion taken from the circled region of FIG. 15 showing that a rear portion of the bearing system is aligned with the track lock and the upper and lower support units are spaced apart longitudinally from one another a rear of the foundation.
Figure 17:
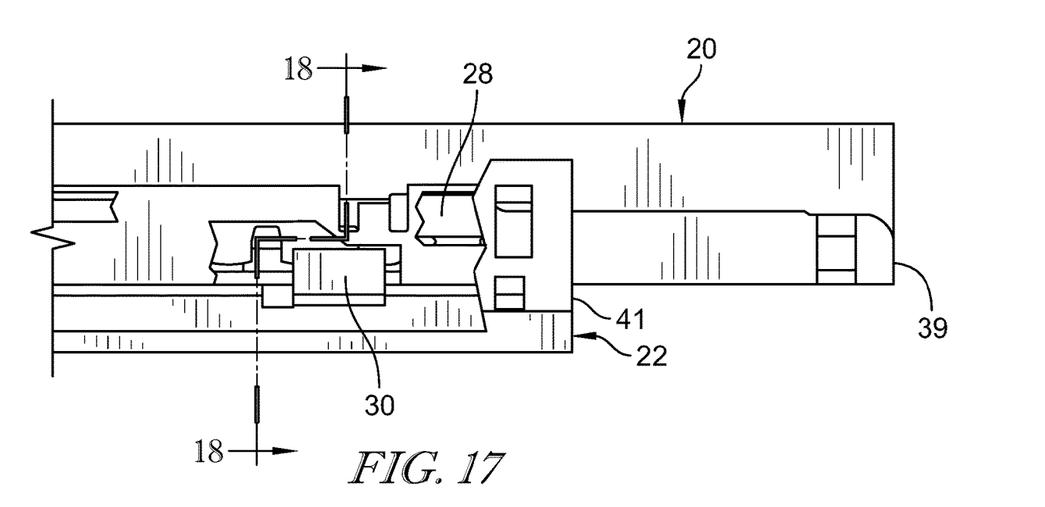
FIG. 17 is an enlarged portion of FIG. 16 showing how the upper barriers of the upper track limit movement of the upper support unit and the lower barriers of the upper track limit movement of the lower support unit.

In another example, the vehicle seat 12 begins in the slid-back configuration as shown in FIGS. 15-18. In the slid-back configuration, the upper and lower support units 28, 30 are spaced apart longitudinally from one another so as not to be aligned with one another as shown in FIG. 16. At the same time, the first bearing cages 53, 57 are aligned vertically with the track lock 26 as shown in FIG. 15. Both bearing units 50, 52 are spaced apart from upper and lower support units 28, 30. In one example a forward-facing surface of the upper support unit 28 is aligned with a rear-ward facing surface of the lower support unit 30 as suggested in FIG. 16.

As an occupant moves the vehicle seat 12 from the slid-forward configuration toward the medial configuration, the upper and lower support units 28, 30 are generally stationary relative to the upper and lower tracks until the second upper barrier 32 coupled to the upper track 20 engages the upper support unit 28 to cause it to move therewith. The second lower barrier 34 also engages the lower support unit 30 to cause it to move therewith. As the occupant moves the vehicle seat 12 from the slid-back configuration toward the medial configuration, the upper and lower support units 28, 30 are engaged by associated first upper and lower barriers 31, 33 to cause the support units 28, 30 to move therewith as the upper track 20 moves relative to the lower track 22.

Figure 7:
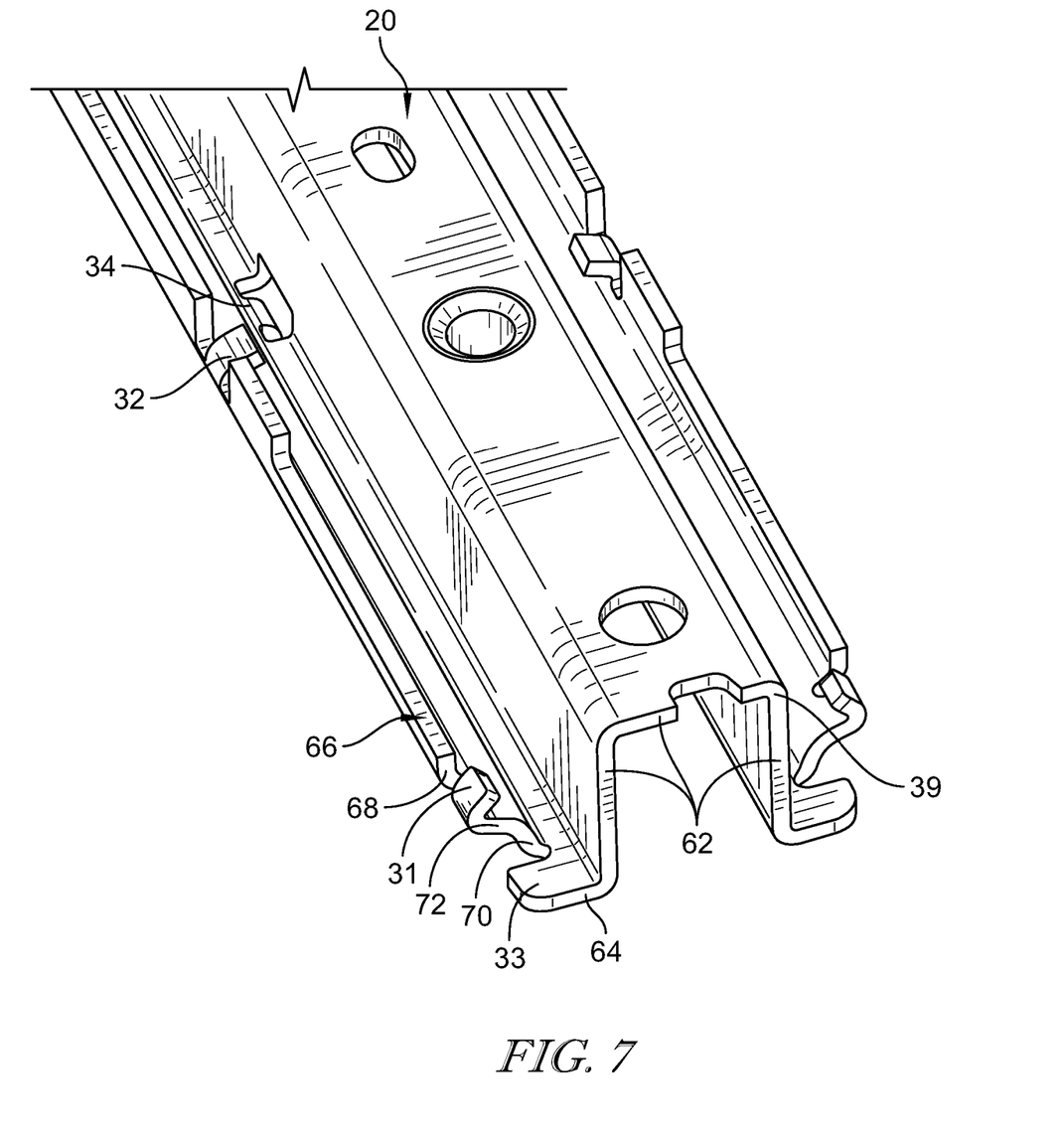
FIG. 7 is a partial perspective view of the upper rails showing that the track-support system includes first and second upper barriers and first and second lower barriers coupled to the upper track.
Figure 8:
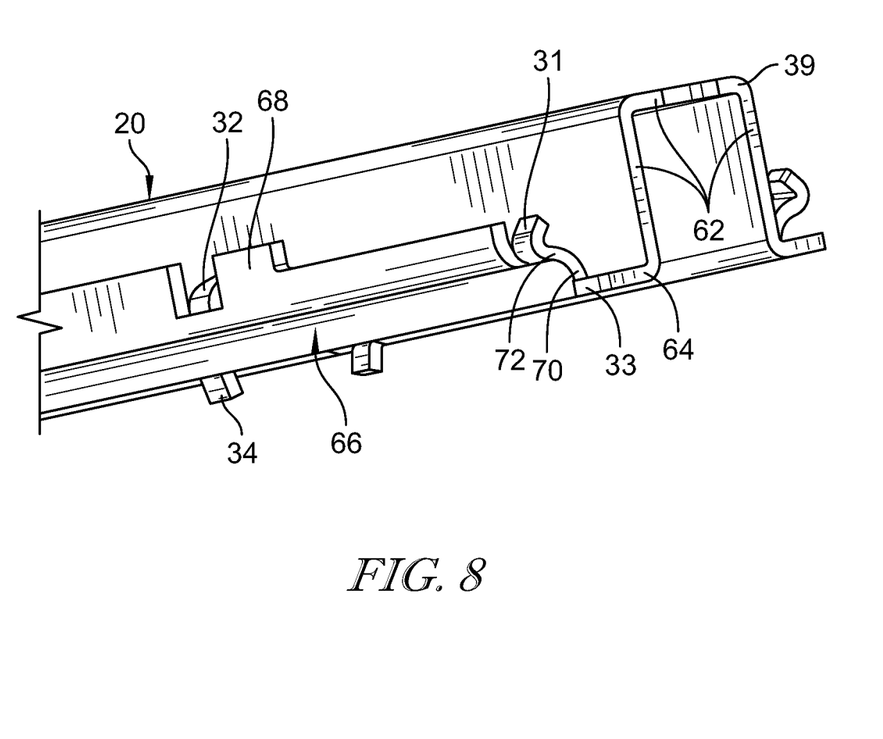
FIG. 8 is a partial perspective view taken from another perspective of the upper track of FIG. 7.
Figure 14:
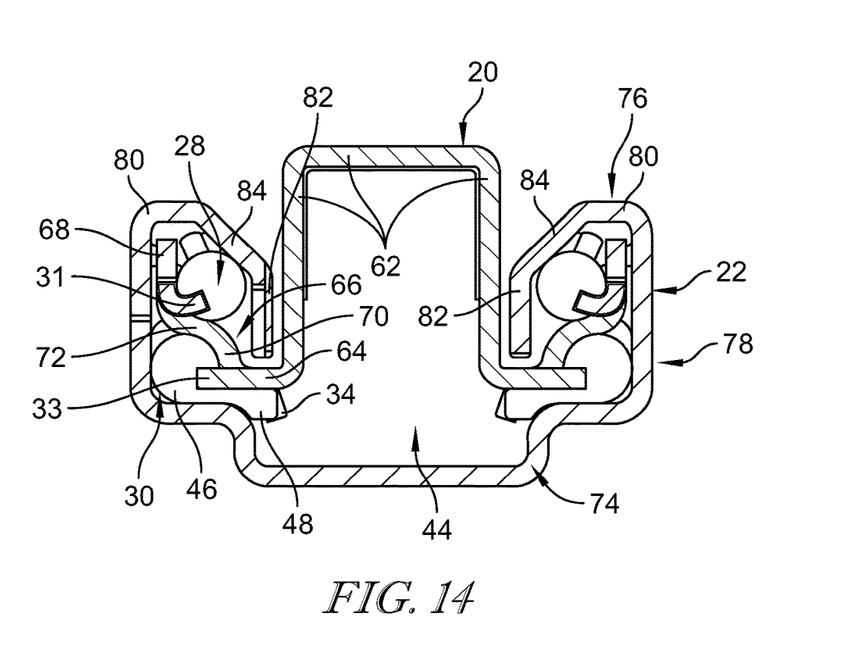
FIG. 14 is a sectional view taken along line 14-14 of FIG. 13 showing how the upper and lower barriers coupled to the upper rail engage the upper and lower support units.
Figure 18:
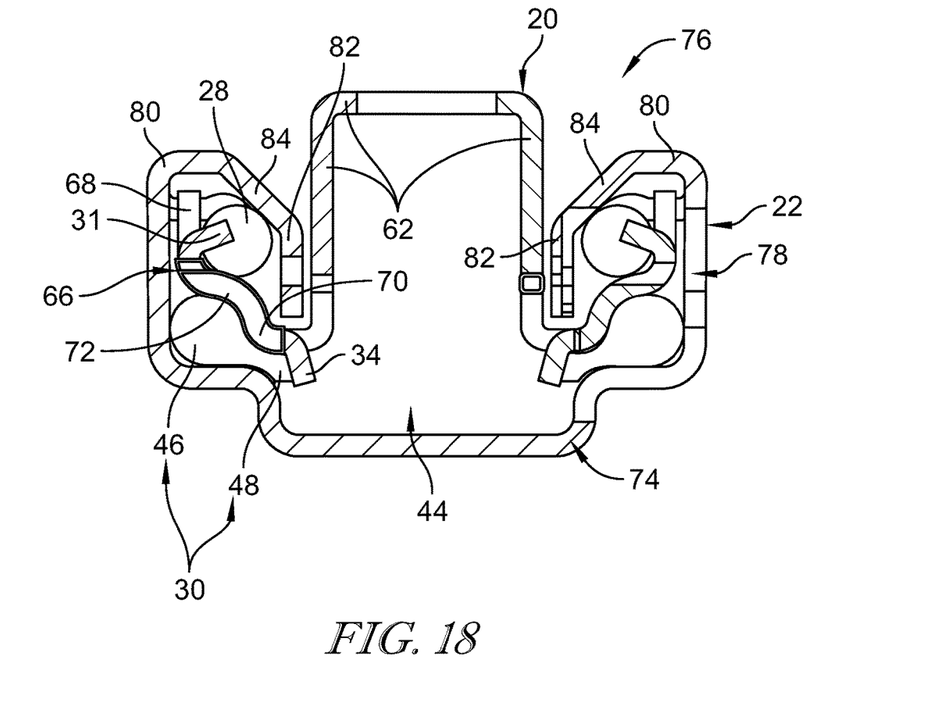
FIG. 18 is a sectional view taken about line 18-18 of FIG. 17 showing how the upper and lower barriers engage and the upper and lower support units.
Figure 19:
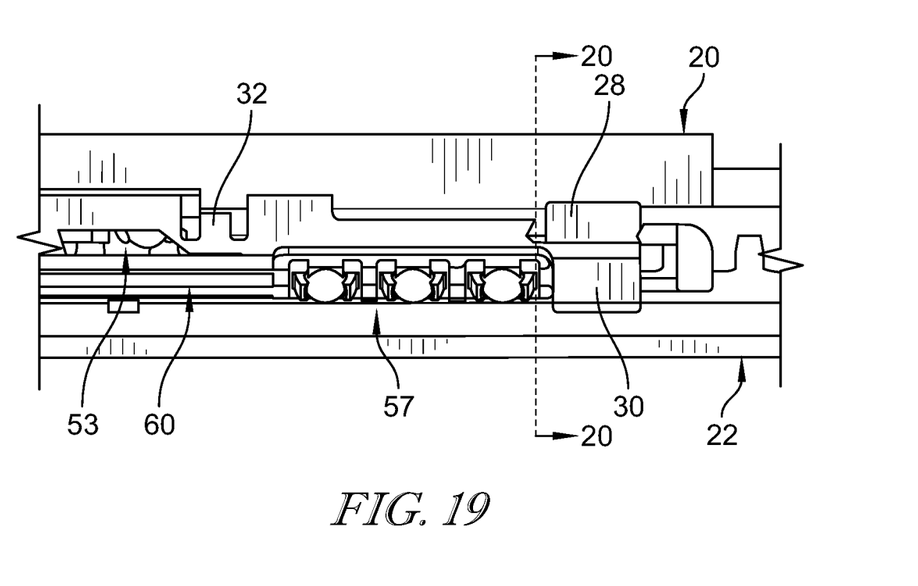
FIG. 19 is a partial elevation view of foundation in the slid-forward configuration showing the relative locations of the upper and lower support units and the bearing system.

The upper track 20 includes an upper-track an upper-track body 62, an upper-track floor 64, and an upper-track sidewall 66 as shown in FIGS. 7, 14, and 18. The upper-track floor 64 is coupled to the upper-track body 62 to extend laterally away from the upper-track body 62. The upper-track sidewall 66 is coupled to the upper-track floor 64 to extend away from the upper-track floor 64.

The upper-track sidewall 66 includes a straight section 68, a first curved section 70, and a second curved section 72 as shown in FIGS. 7, 14, and 18. The straight section 68 is located in spaced-apart relation to the upper-track body 62 and upper-track floor 64. The first curved section 70 is coupled to the upper-track floor 64 and arranged to extend from the upper-track floor 64 toward the straight section 68. The second curved section 72 is coupled to the straight section 68 and is arranged to extend away from the straight section 68 toward the first curved section 70 and couple to the first curved section 70. The first curved section 70 has a concave surface arranged to extend toward the upper-track body 62. The second curved section 72 has a convex surface arranged to extend away from the upper-track body 62.

The lower track 22 includes a lower-track body 74, a lower-track ceiling 76, and lower-track sidewall 78 as shown in FIG. 14. The lower-track ceiling 76 is located in spaced-apart relation to the lower-track body 74. The lower-track sidewall 78 is arranged to extend between and interconnect the lower-track ceiling 76 and lower-track body 74.

Figure 20:
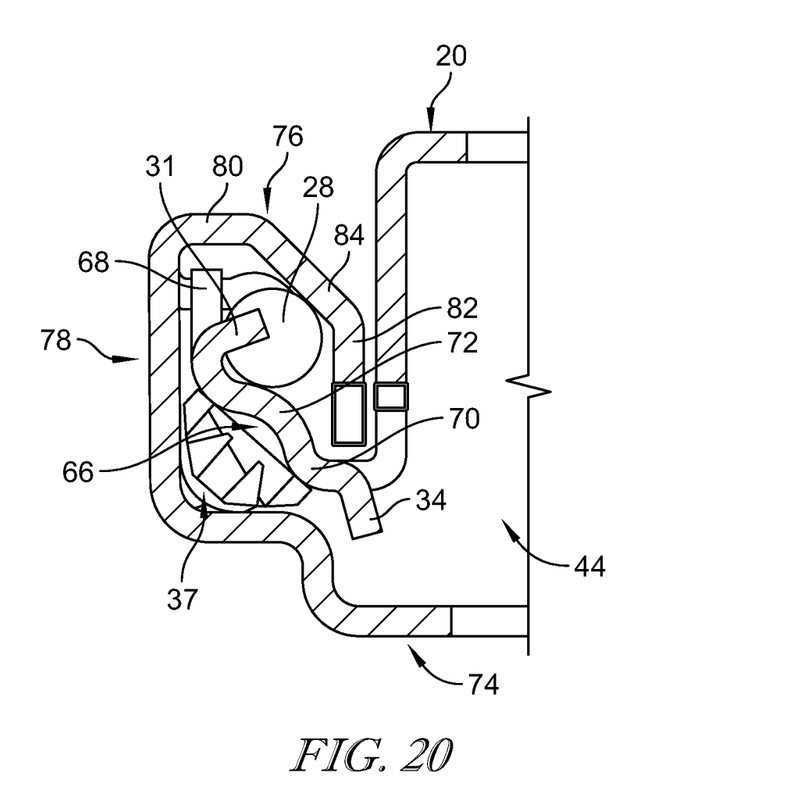
FIG. 20 is a partial elevation view of FIG. 19 suggesting that the second upper and lower barriers are configured to allow the bearing system to move past the second upper and lower barriers to engage the upper and lower support units.

The lower-track ceiling 76 includes a horizontal section 80, a vertical section 82, and an angled section 84 as shown in FIGS. 18 and 20. The horizontal section 80 is coupled to the lower-track sidewall 78 and is arranged to extend laterally toward the upper track 20. The vertical section 82 is located in spaced-apart lateral relation to the lower-track sidewall 78 to locate the horizontal section 80 therebetween. The angled section 84 is arranged to extend between and interconnect the horizontal section 80 and the vertical section 82.

The upper support unit 28 is configured to engage and contact the straight section 68 and the second curved section 72 of the upper-track sidewall 66. The upper support unit 28 also engages and contacts the angled section 84 of the lower-track ceiling. The lower support unit 30 is configured to engage a portion of the lower-track body 74, the lower-track sidewall 78 and the second curved section 72 of the upper track side wall.

The first upper barrier 31 is arranged to extend into the upper-bearing travel path so as to block movement of the upper bearing unit 50 and the upper support unit 28 as suggested in FIGS. 14 and 18. The second upper barrier 32 is arranged to lie in spaced-apart relation to the upper bearing unit 50 but limit movement of the upper support unit 28. The first upper barrier 31 extends away from the second curved section 72 at an acute angle and the second upper barrier 32 extends away from the second curved section 72 at a relatively greater second acute angle so as to allow the bearing unit to pass under the second upper barrier 32.

The first lower barrier 33 is arranged to extend into the lower-bearing travel path so as to block movement of the lower bearing unit 52 and the lower support unit 30 as suggested in FIG. 14. The second lower barrier 34 is arranged to lie in spaced-apart lateral relation to the lower bearing unit 52 but limit movement of the lower support unit 30. The first lower barrier 33 is coupled to the upper-track floor 64 and arranged to extend laterally away from the upper-track body 62 at about a right angle to the upper-track body 62 and parallel to the upper-track floor 64. The second lower barrier 34 cooperates with the upper-track floor 64 to form an acute angle therebetween. The second lower barrier engages the support-unit tail 48 of the lower support unit 30 but does not engage the support-unit body 46.

The invention claimed is:

1. A passenger support comprising
a seat foundation adapted to couple to a floor of a vehicle, the seat foundation including a lower track coupled to the floor in a fixed position relative to the floor and an upper track coupled to the lower track to slide back and forth relative to the lower track along a travel path,
a vehicle seat coupled to the upper track to move therewith between a slid-back configuration, a medial configuration, and a slid-forward configuration, and
a track-support system being located between the upper and lower tracks and including an upper support unit coupled to the upper track to move therewith and relative thereto and a lower support unit coupled to the upper track to move with the upper track and relative to the upper track and the upper support unit,
wherein the upper track has a first upper end and an opposite second upper end and the lower track has a first lower end and an opposite second lower end and the first upper end of the upper track is located a first distance from the first lower end of the lower track when the vehicle seat is in the slid-forward configuration,
wherein the second upper end of the upper track is located between the first and second lower ends of the lower track and the first upper end is located a relatively smaller second distance from the first lower end when the vehicle seat is in the slid-back configuration,
wherein the track-support system further includes an upper retainer coupled to the lower track in a fixed position relative to the lower track and located between the first and second lower ends of the lower track and a lower retainer coupled to the lower track in a fixed position relative to the upper track, and
wherein the track-support system further includes a first upper barrier coupled to the upper track in a fixed position relative to the upper track and located between the first and second upper ends of the upper track and a second upper barrier coupled to the upper track in a fixed position relative to the upper track and located between the first upper barrier and the second upper end of the upper track.

2. The passenger support of claim 1, wherein the upper support unit is spaced apart from the lower support unit to locate a portion of the upper track between the upper support unit and the lower support unit.

3. The passenger support of claim 1, wherein the upper retainer and the lower retainer are aligned vertically with one another.

4. The passenger support of claim 1, wherein the track-support system further includes a first lower barrier coupled to the upper track in a fixed positon relative to the upper track and located between first and second upper ends of the upper track.

5. The passenger support of claim 1, wherein the track-support system further includes a first lower barrier coupled to the upper track in a fixed position relative to the upper track and located between first and second upper ends of the upper track and a second lower barrier coupled to the upper track in a fixed position relative to the upper track and located between the first lower barrier and the second upper end of the upper track.

6. The passenger support of claim 5, wherein the first upper barrier is located between the second upper barrier and the first lower barrier, the second upper barrier is located between the second lower barrier and the first upper barrier, and the upper support unit is located between the first and second upper barriers and configured to move back and forth between the first and second upper barriers relative to the upper track.

7. The passenger support of claim 6, wherein the lower support unit is located between the first and second lower barriers and configured to move back and forth between the first and second lower barriers relative to the upper track.

8. The passenger support of claim 1,
wherein the upper track includes an upper-track body, an upper-track floor coupled to the upper-track body to extend laterally away from the upper-track body, and an upper-track sidewall coupled to the upper-track floor to extend away from the upper-track floor and
wherein the upper-track sidewall includes a straight section located in spaced-apart relation to the upper-track body and the upper-track floor, a first curved section coupled to the upper-track floor and arranged to extend from the upper-track floor toward the straight section, and a second curved section coupled to the straight section to extend away from the straight section toward the first curved section and couple to the first curved section, the first curved section has a concave surface arranged to extend toward the upper-track body, the second curved section has a convex surface arranged to extend away from the upper-track body, and the upper support unit is spaced apart from the lower support unit to locate the upper-track sidewall between the upper support unit and the lower support unit.

9. The passenger support of claim 8, wherein the upper support unit has a generally cylindrical shape.

10. The passenger support of claim 1, wherein the seat foundation further includes an upper bearing unit and a lower bearing unit and the upper bearing unit is spaced apart from the lower bearing unit to locate a portion of the upper track between the upper bearing unit and the lower bearing unit.

11. The passenger support of claim 10, wherein the upper support unit and the lower support unit are located between the first and second upper ends of the upper track when the vehicle seat is in one of the slid-back configuration, the medial configuration, and the slid-forward configuration.

12. The passenger support of claim 11, wherein upper and lower support units are located between the first and second lower ends of the lower track when the vehicle seat is in one of the slid-back configuration, the medial configuration, and the slid-forward configuration.

13. The passenger support of claim 10, wherein the seat foundation further includes a track lock coupled to the upper track to move therewith and relative thereto between an engaged position in which the track lock interconnects the upper track and the lower track to block movement of the upper track relative to the lower track and a disengaged position in which the track lock is spaced apart from the lower track to allow the upper track and the vehicle seat to slide back and forth between the slid-back configuration, the medial configuration, and the slid-forward configuration and the track lock is located between the first and second upper ends of the upper track.

14. The passenger support of claim 13, wherein the upper bearing unit includes a first bearing cage engaging both the upper and lower tracks, a second bearing cage located in spaced-apart relation to the first bearing cage and engaging the upper and lower tracks, and a cage link arranged to extend between and interconnect the first and second bearing cages to cause the first and second bearing cages to move back and forth together and the first bearing cage is located between a first upper end of the upper track and the second bearing cage.

15. The passenger support of claim 1,
wherein the seat foundation further includes an upper bearing unit and a lower bearing unit and the upper bearing unit is spaced apart from the lower bearing unit to locate a portion of the upper track between the upper bearing unit and the lower bearing unit,
wherein the seat foundation further includes a track lock coupled to the upper track to move therewith and relative thereto between an engaged position in which the track lock interconnects the upper track and the lower track to block movement of the upper track relative to the lower track and a disengaged position in which the track lock is spaced apart from the lower track to allow the upper track and the vehicle seat to slide back and forth between the slid-back configuration, the medial configuration, and the slid-forward configuration and the track lock is located between the first and second upper ends of the upper track,
wherein the upper bearing unit includes a first bearing cage engaging both the upper and lower tracks, a second bearing cage located in spaced-apart relation to the first bearing cage and engaging the upper and lower tracks, and a cage link arranged to extend between and interconnect the first and second bearing cages to cause the first and second bearing cages to move back and forth together and the first bearing cage is located between a first upper end of the upper track and the second bearing cage, and
wherein the first bearing cage and the track lock are aligned vertically when the vehicle seat is in the slid-back configuration.

16. The passenger support of claim 15, wherein the upper support unit is spaced-apart longitudinally from the lower support unit when the vehicle seat is in the slid-back configuration.

17. The passenger support of claim 16, wherein a second bearing cage of the lower bearing unit and the track lock are aligned vertically when the vehicle seat is in the slid-forward configuration.

18. The passenger support of claim 17, wherein the upper support unit is aligned vertically with the lower support unit when the vehicle seat is in the slid-forward configuration.

19. The passenger support of claim 18, wherein the lower support unit engages and moves the lower bearing unit during movement of the vehicle seat from the slid-back configuration toward one of the medial and slid-forward configurations.

20. A passenger support comprising
a seat foundation adapted to couple to a floor of a vehicle, the seat foundation including a lower track coupled to the floor in a fixed position relative to the floor and an upper track coupled to the lower track to slide back and forth relative to the lower track along a travel path,
a vehicle seat coupled to the upper track to move therewith between a slid-back configuration, a medial configuration, and a slid-forward configuration, and
a track-support system being located between the upper and lower tracks and including an upper support unit coupled to the upper track to move therewith and relative thereto and a lower support unit coupled to the upper track to move with the upper track and relative to the upper track and the upper support unit,
wherein the lower support unit includes a support-unit body and a support-unit tail coupled to the support-unit body and arranged to extend toward the upper-track.

21. The passenger support of claim 20, wherein the support-unit body has a generally cylindrical shape and the support-unit tail has a bow-tie shape in which a narrow portion of the bow-tie shape is located between the lower track and an intersection of a first curved section and a upper-track floor.

22. A passenger support comprising
a seat foundation adapted to couple to a floor of a vehicle, the seat foundation including a lower track coupled to the floor in a fixed position relative to the floor and an upper track coupled to the lower track to slide back and forth relative to the lower track along a travel path,
a vehicle seat coupled to the upper track to move therewith between a slid-back configuration, a medial configuration, and a slid-forward configuration, and
a track-support system being located between the upper and lower tracks and including an upper support unit coupled to the upper track to move therewith and relative thereto, a lower support unit coupled to the upper track to move with the upper track and relative to the upper track and the upper support unit, and a plurality of barriers configured to engage the upper support unit and the lower support unit to limit movement of the upper support unit and the lower support unit relative to the upper track as the upper track moves relative to the lower track, wherein the upper support unit is aligned vertically with the lower support unit when the vehicle seat is in the slid-forward configuration and the upper support unit is spaced-apart longitudinally from the lower support unit when the vehicle seat is in the slid-back configuration.

* * * * *